US008599219B2

(12) United States Patent
Shechtman et al.

(10) Patent No.: US 8,599,219 B2
(45) Date of Patent: Dec. 3, 2013

(54) METHODS AND APPARATUSES FOR GENERATING THUMBNAIL SUMMARIES FOR IMAGE COLLECTIONS

(75) Inventors: Elya Shechtman, Seattle, WA (US);
Daniel R. Goldman, Seattle, WA (US);
David E. Jacobs, Westlake Village, CA (US)

(73) Assignee: Adobe Systems Incorporated, San Jose, CA (US)

( * ) Notice: Subject to any disclaimer, the term of this patent is extended or adjusted under 35 U.S.C. 154(b) by 535 days.

(21) Appl. No.: 12/868,540

(22) Filed: Aug. 25, 2010

(65) Prior Publication Data

US 2013/0120454 A1    May 16, 2013

Related U.S. Application Data

(60) Provisional application No. 61/243,931, filed on Sep. 18, 2009.

(51) Int. Cl.
*G09G 5/02* (2006.01)
*G06T 3/40* (2006.01)
*G06T 11/00* (2006.01)
*G06T 15/50* (2011.01)

(52) U.S. Cl.
CPC ........... *G06T 3/4038* (2013.01); *G06T 11/00* (2013.01); *G06T 15/503* (2013.01)
USPC ........................................................ 345/635

(58) Field of Classification Search
CPC ...... G06T 3/4038; G06T 11/00; G06T 15/503
USPC ........................................................ 345/635
See application file for complete search history.

(56) References Cited

U.S. PATENT DOCUMENTS

| 4,524,454 A | 6/1985 | Ejiri |
| 4,851,984 A | 7/1989 | Doi et al. |
| 5,764,237 A | 6/1998 | Kaneko |
| 5,867,166 A | 2/1999 | Myhrvold et al. |
| 5,870,097 A | 2/1999 | Snyder et al. |
| 5,999,194 A | 12/1999 | Brunelle |
| 6,177,927 B1 | 1/2001 | Chery et al. |
| 6,262,745 B1 | 7/2001 | Perani |
| 6,272,178 B1 | 8/2001 | Nieweglowski et al. |
| 6,314,209 B1 | 11/2001 | Kweon et al. |

(Continued)

OTHER PUBLICATIONS

Automatic thumbnail cropping and its effectiveness Bongwon Suh, Haibin Ling, Benjamin B. Bederson, David W. Jacobs Nov. 2003; Proceedings of the 16th annual ACM symposium on User interface software and technology Publisher: ACM Request Permissions.*

(Continued)

*Primary Examiner* — Javid A Amini
(74) *Attorney, Agent, or Firm* — Wolfe-SBMC (57) ABSTRACT

Methods and apparatuses for generating thumbnail summaries for image collections are described. Thumbnails summaries may be representative of the image collection while being disjoint from each other. In some embodiments, a method may sample crops from some or all images in an image collection. From these candidate crops, the method may select representative but disjoint crops. In some embodiments, a desired representativeness and/or disjointedness of the candidate crops may be defined by a user. The method may then generate and/or select thumbnail summaries for the collection of images based at least in part on the selected candidate crops.

24 Claims, 5 Drawing Sheets

(56) References Cited

U.S. PATENT DOCUMENTS

| | | | |
|---|---|---|---|
| 6,348,924 | B1 | 2/2002 | Brinsmead et al. |
| 6,453,069 | B1 | 9/2002 | Matsugu et al. |
| 6,636,644 | B1 | 10/2003 | Itokawa |
| 6,687,411 | B1 | 2/2004 | Miura et al. |
| 6,762,769 | B2 | 7/2004 | Xu et al. |
| 6,919,903 | B2 | 7/2005 | Freeman et al. |
| 6,920,610 | B1 | 7/2005 | Lawton et al. |
| 6,931,600 | B1 | 8/2005 | Pittman |
| 6,937,275 | B2 * | 8/2005 | Heiles ............... 348/231.2 |
| 6,964,025 | B2 * | 11/2005 | Angiulo et al. ........... 715/838 |
| 6,987,535 | B1 | 1/2006 | Matsugu et al. |
| 7,012,624 | B2 | 3/2006 | Zhu et al. |
| 7,034,848 | B2 | 4/2006 | Sobol |
| 7,069,506 | B2 | 6/2006 | Rosenholtz et al. |
| 7,136,072 | B2 | 11/2006 | Ritter |
| 7,176,908 | B2 | 2/2007 | Matsubara et al. |
| 7,239,314 | B2 | 7/2007 | Johnston |
| 7,257,261 | B2 | 8/2007 | Suh |
| 7,283,140 | B2 | 10/2007 | Zhou et al. |
| 7,342,586 | B2 | 3/2008 | Jaeger |
| 7,418,673 | B2 | 8/2008 | Oh |
| 7,479,963 | B2 | 1/2009 | Lischinski et al. |
| 7,576,756 | B1 | 8/2009 | Good et al. |
| 7,577,313 | B1 | 8/2009 | Georgiev |
| 7,596,751 | B2 | 9/2009 | Rowson et al. |
| 7,639,268 | B2 | 12/2009 | Tsunoda |
| 7,737,977 | B2 | 6/2010 | Grassia et al. |
| 8,179,384 | B2 | 5/2012 | Sakashita et al. |
| 8,249,365 | B1 | 8/2012 | Winnemoeller et al. |
| 8,280,703 | B1 | 10/2012 | Mech |
| 8,532,387 | B2 | 9/2013 | Winnemoeller et al. |
| 2003/0090487 | A1 | 5/2003 | Dawson-Scully |
| 2004/0114814 | A1 * | 6/2004 | Boliek et al. .......... 382/233 |
| 2004/0155879 | A1 | 8/2004 | Mittring |
| 2005/0188304 | A1 | 8/2005 | Lawton et al. |
| 2005/0243089 | A1 | 11/2005 | Johnston |
| 2006/0026524 | A1 | 2/2006 | Ma et al. |
| 2006/0072847 | A1 | 4/2006 | Chor et al. |
| 2006/0085743 | A1 * | 4/2006 | Baudisch et al. ......... 715/526 |
| 2006/0267958 | A1 | 11/2006 | Kolmykov-Zotov et al. |
| 2007/0047012 | A1 * | 3/2007 | Bryant ................ 358/403 |
| 2007/0098266 | A1 | 5/2007 | Chiu et al. |
| 2008/0086688 | A1 * | 4/2008 | Chandratillake et al. ..... 715/719 |
| 2008/0117214 | A1 | 5/2008 | Perani et al. |
| 2008/0152201 | A1 | 6/2008 | Zhang et al. |
| 2008/0235207 | A1 * | 9/2008 | Berkner et al. ........... 707/5 |
| 2008/0235585 | A1 * | 9/2008 | Hart et al. ............. 715/717 |
| 2008/0309662 | A1 | 12/2008 | Hassner et al. |
| 2009/0058871 | A1 | 3/2009 | Mech et al. |
| 2009/0208118 | A1 * | 8/2009 | Csurka ................ 382/228 |
| 2009/0276408 | A1 * | 11/2009 | Auerbach et al. .......... 707/3 |
| 2010/0066874 | A1 | 3/2010 | Ishiga |
| 2010/0110068 | A1 | 5/2010 | Yamauchi et al. |
| 2010/0226564 | A1 * | 9/2010 | Marchesotti et al. ........ 382/159 |
| 2010/0251121 | A1 | 9/2010 | Rosser et al. |
| 2011/0016112 | A1 * | 1/2011 | Yu .................. 707/723 |
| 2011/0064388 | A1 | 3/2011 | Brown |
| 2011/0066706 | A1 * | 3/2011 | Ostrover et al. ......... 709/219 |
| 2012/0133817 | A1 * | 5/2012 | Anderson ............. 348/333.05 |
| 2013/0051685 | A1 | 2/2013 | Shechtman |
| 2013/0120438 | A1 | 5/2013 | Shechtman |
| 2013/0121608 | A1 | 5/2013 | Winnemoeller |
| 2013/0121613 | A1 | 5/2013 | Winnemoeller |

OTHER PUBLICATIONS

"PatchMatch: A Randomized Correspondence Algorithm for Structural Image Editing," ACM Transactions on Graphics, Barnes, C., Shechtman, E., Finkelstein, A. and Goldman, Dan B., Proc. SIGGRAPH 28(3), Aug. 2009, 10 pages.

Whyte, O., Sivic, J., and Zisserman, A. 2009. Get out of my picture! internet-based inpainting. In BMVC (British Machine Vision Conference), 11 pages.

U.S. Appl. No. 12/868,519, filed Aug. 25, 2010, Elya Shechtman, et al.

U.S. Appl. No. 12/857,294, filed Aug. 16, 2010, Dan Goldman, et al.

P. Bhat, B. Curless, M. Cohen, and C. L. Zitnick. Fourier analysis of the 2d screened poisson equation for gradient domain problems. In ECCV, 2008, 14 pages.

U.S. Appl. No. 12/394,280, filed Feb. 27, 2009, Dan Goldman, et al.

Yonatan Wexler, Eli Shechtman, Michal Irani. Space-Time Completion of Video. IEEE Transactions on Pattern Analysis and Machine Intelligence, vol. 29, No. 3, Mar. 2007, 14 pages.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, 294-302.

Arias, P., Facciolo, G., Caselles, V., and Sapiro, G. 2011. A variational framework for exemplar-based image inpainting. IJCV 93 (July), 319-347.

U.S. Appl. No. 12/315,038, filed Nov. 26, 2008, Dan Goldman, et al.

Burt, P. J., and Adelson, E. H. 1983. A multiresolution spline with application to image mosaics. ACM Trans. Graphics 2 (October), 217-236.

Efros, A. A., and Leung, T. K. 1999. Texture synthesis by non-parametric sampling. IEEE Computer Society, Los Alamitos, CA, USA, 6 pages.

Fang, H., and Hart, J. C. 2007. Detail preserving shape deformation in image editing. In ACM SIGGRAPH, vol. 26, pp. 1-5.

Hays, J., and Efros, A. A. 2007. Scene completion using millions of photographs. In ACM SIGGRAPH, vol. 26, 4:1-4: 7 pages.

Kwatra, V., Essa, I., Bobick, A., and Kwatra, N. 2005. Texture optimization for example-based synthesis. In ACM SIGGRAPH, vol. 24, 795-802.

Kwatra, V., Schöodl, A., Essa, I., Turk, G., and Bobick, A. 2003. Graphcut textures: image and video synthesis using graph cuts. In ACM SIGGRAPH, vol. 22, 277-286.

Perez, P., Gangnet, M., and Blake, A. 2003. Poisson image editing. In ACM SIGGRAPH, vol. 22, 313-318.

Rother, C., Bordeaux, L., Hamadi, Y., and Blake, A. 2006. AutoCollage. In ACM SIGGRAPH, vol. 25, 847-852.

Simakov, D., Caspi, Y., Shechtman, E., and Irani, M. 2008. Summarizing visual data using bidirectional similarity. In CVPR, 8 pages.

Szeliski, R., and Shum, H.-Y. 1997. Creating full view panoramic image mosaics and environment maps. In ACM SIGGRAPH, 251-258.

Tappen, M., Freeman, W., and Adelson, E. 2005. Recovering intrinsic images from a single image. IEEE Trans. PAMI 27, 9 (Sep.), 1459-1472.

Wei, L. Y., and Levoy, M. 2000. Fast texture synthesis using tree-structured vector quantization. In ACM SIGGRAPH, 479-488.

U.S. Appl. No. 12/858,546, filed Aug. 18, 2010, Holger Winnemoeller, et al.

U.S. Appl. No. 13/565,552, filed Aug. 2, 2012, Elya Shechtman, et al.

U.S. Appl. No. 12/858,558, filed Aug. 18, 2010, Holger Winnemoeller, et al.

Kajiya, J. T. and Kay, T. L. 1989. Rendering fur with three dimensional textures. SIGGRAPH Comput. Graph. 23, 3 (Jul. 1989), 271-280.

Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH'03. ACM, New York, NY, 780-791.

Chen, H. and Zhu, S. 2006. A Generative Sketch Model for Human Hair Analysis and Synthesis. IEEE Trans. Pattern Anal. Mach. Intell. 28, 7 (Jul. 2006), 1025-1040.

H. Chen and S. C. Zhu, "A generative model of human hair for hair sketching", CVPR (IEEE Conference on Computer Vision and Pattern Recognition), 2:74-81, 2005.

David J. Heeger and James R. Bergen. Pyramid-based texture analysis/synthesis. In SIGGRAPH,95, pp. 229-238, 1995.

"ArtRage 3", *Ambient Design*, http://www.ambientdesign.com/, from web.archive.org on Aug. 23, 2011, (May 25, 2010), 1 page.

"Auryn Inc. Auryn Ink", *iTunes Preview*, retrieved from <http://itunes.apple.com/us/app/auryn-Aurynl%_201nklid407668628>, (Jul. 20, 2011), 2 pages.

(56) References Cited

OTHER PUBLICATIONS

"Auryn Ink Review", www.giggleapps.com, (Feb. 10, 2011), 4 pages.
"Corel Painter 11 Features", retrieved from <http://web.archive.org/web/20100526115240/http://www.corel.com/servlet/Satellite/us/en/Product/1166553885783#tabview=tab1> on Mar. 23, 2011, 3 pages.
"Corel Painter 11 Overview", retrieved from <http://web.archive.org/web/20100526115240/http://www.corel.com/servlet/Satellite/us/en/Product/1166553885783#tabview=tab0> on Aug. 23, 2011, 3 pages.
"Final Office Action", U.S. Appl. No. 12/858,558, (Feb. 15, 2013), 14 pages.
"Non-Final Office Action", U.S. Appl. No. 12/858,546, (Jan. 30, 2013), 19 pages.
"Non-Final Office Action", U.S. Appl. No. 12/858,558, (Aug. 30, 2012), 10 pages.
"Non-Final Office Action", U.S. Appl. No. 12/868,519, (Feb. 7, 2013), 16 pages.
"Notice of Allowance", U.S. Appl. No. 12/858,546, (May 6, 2013), 12 pages.
"Notice of Allowance", U.S. Appl. No. 12/858,552, (Apr. 20, 2012), 8 pages.
U.S. Appl. No. 12/039,164, filed Feb. 28, 2008, 60 pages.
Ando, Ryoichi et al., "Vector Fluid: A Vector Graphics Depiction of Surface Flow", *NPAR '10: Proceedings of the 8th International Symposium on Non-photorealistic Animation and Rendering* (pp. 129-135). New York, NY, USA: *ACM*, (2010), 7 pages.
Ando, Ryoichi et al., "Vector Graphics Depicting Marbling Flow", *Computers & Graphics*, vol. 35, Issue 1, (Nov. 29, 2010), 14 pages.
Ashikhmin, Michael "Synthesizing Natural Textures", *Proceedings of the Symposium on Interactive 3D Graphics 2001*, 10 pages.
Barla, et al., "Stroke Pattern Analysis and Synthesis", *Eurographics 2006*, vol. 25 (2006), No. 3, (2006), 9 pages.
Barnes, Connelly et al., "The Generalized PatchMatch Correspondence Algorithm", retrieved from <http://www.cs.princeton.edu/gfx/pubs/Barnes_2010_TGP/index.php> on Sep. 9, 2010, 14 pages.
Bhat, Pravin et al., "GradientShop: A Gradient-Domain Optimization Framework for Image and Video Filtering", *ACM Transactions on Graphics* 29(2), (2010), 15 pages.
Bugeau, Aurelie et al., "A Comprehensive Framework Transactions on Image Inpainting", *IEEE Transactions on Image Processing*, vol. 19, No. 10, (Oct. 2010), pp. 2634-2645.
Chen, Xuejin et al., "Sketch-Based Tree Modeling Using Markov Random Field", *ACM Trans. on Graphics* 27, 5, (2008), 9 pages.
Deussen, Oliver et al., "Floating Points: A Method for Computing Stipple Drawings", *Eurographics 2000*, vol. 19, No. 3, (2000), 10 pages.
Deussen, Oliver et al., "The Elements of Nature: Interactive and Realistic Techniques", *SIGGRAPH 2004 Course 31*, (2004), 64 pages.
Diverdi, et al., U.S. Appl. No. 13/219,457, filed Aug. 26, 2011, 104 pages.
Diverdi, Stephen J., et al., "U.S. Appl. No. 13/219,453, filed Aug. 26, 2011", 102 pages.
Duran, Jonathan "Deco Tool and Spray Brush for Creating Complex, Geometric Patterns in Flash", retrieved from <http://www.adobe.com/devnet/flash/articles/deco_intro.html> on Aug. 31, 2010, (Feb. 2, 2009), 19 pages.
Esch, Greg et al., "Interactive Procedural Street Modeling", *SIGGRAPH 2007 Sketches*, 1 page.
Hacohen, Yoav et al., "Non-Rigid Dense Correspondence with Applications for Image Enhancement", *SIGGRAPH*, (2011), 9 pages.
Hang, Chu S., "Making Digital Painting Organic", *PhD Thesis, Hong Kong University of Science and Technology*, (Aug. 2007), 126 pages.
Hertzmann, Aaron et al., "Curve Analogies", *13th Eurographics Workshop on Rendering* (2002), 13 pages.
Hertzmann, Aaron et al., "Image Analogies",*Proceedings of SIGGRAPH 2001*, 14 pages.
Igarashi, Takeo et al., "A Suggestive Interface for 3D Drawing", *Proceedings of the ACM Symposium on User Interface Software and Technology, UIST 01. 2001, ACM*: Orlando, Florida, (2001),9 pages.
Ijiri, Takashi et al., "The Sketch L-System: Global Control of Tree Modeling Using Free-Form Strokes", *Proceedings of 6th International Symposium SmartGraphics 2006*, 9 pages.
Jodoin, Pierre-Marc et al., "Hatching by Example: A Statistical Approach", *Proceedings of NPAR 2002*, 8 pages.
Kaneva, Biliana et al., "Infinite Images: Creating and Exploring a Large Photorealistic Virtual Space", *Proceeding of the IEEE*, vol. 98, No. 8, (Aug. 2010), 17 pages.
Lee, Hyunjoon et al., "Automatic Upright Adjustment of Photographs", *CVPR*, (2012), 11 pages.
Lin, Wen-Yan et al., "Smoothly Varying Affine Stitching", *Proceedings of Computer Vision and Pattern Recognition (CVPR)*, (Jun. 2011), 13 pages.
Lintermann, Bernd et al., "Interactive Modeling of Plants", *IEEE Computer Graphics and Applications*, 19 (1999), 1, pp. 2-11
Lloyd, Stuart P., "Least Squares Quantization in PCM", *IEEE Transactions on Information Theory*, vol. 28, No. 2, (Mar. 1982), pp. 129-137.
Mansfield, Alex et al., "Transforming Image Completion", *Proceedings of British Machine Vision Conference (BMVC)*, (Aug. 29, 2011), 11 pages.
Marks, et al., "Design Galleries: A General Approach to Setting Parameters for Computer Graphics and Animation", *ACM Computer Graphics (SIGGRAPH '97 Proceedings)*, (Aug. 1997), 26 pages.
Matsuda, Okiharu "U.S. Appl. No. 13/219,848, filed Aug. 29, 2011", 27 pages.
McVeigh, Chris "ArtRage Studio Pro 3", *PCWorld*, retrieved from <http://www.pcworld.com/businesscenter/article/189221/artrage_studio_pro_3.html> on Aug. 23, 2011 4 pages.
Mech, Radomir et al., U.S. Appl. No. 12/857,382, filed Aug. 16, 2010, 57 pages.
Mech, Radomir et al., U.S. Appl. No. 13/029,036, filed Feb. 16, 2011, 69 pages.
Mech, Radomir et al., "Visual Models of Plants Interacting with Their Environment", *Proceedings of SIGGRAPH 96* (New Orleans, LA, Aug. 4-9, 1996), *Computer Graphics*, (1996), 15 pages.
Muller, Matthias et al., "Meshless Deformations Based on Shape Matching", *ACM Transactions on Computer Graphics*, 24, 3 (2005), 8 pages.
Muller, Pascal et al., "Procedural Modeling of Buildings", *ACM Trans. Graph.*, 25 (2006), 3, 10 pages.
Parish, Yoav I., et al., "Procedural Modeling of Cities", *Proceedings of ACM SIGGRAPH 2001*, 8 pages.
Pritch, Yael et al., "Shift-Map Image Editing", *ICCV '09*, Kyoto, Japan, (Sep. 2009), 8 pages.
Prusinkiewicz, et al., "Phyllotaxis", *The Algorithmic Beauty of Plants, Springer-Verlag, Chapter 4, ISBN 978-0387972978*, (1990), pp. 99-118.
Prusinkiewicz, et al., "Synthetic Topiary", *Proceedings of ACM SIGGRAPH*, (1994), 8 pages.
Ruiters, Roland et al., "Patch-Based Texture Interpolation", *Eurographics Symposium on Rendering*, vol. 29, No. 4, (2010), 9 pages.
Salisbury, Michael P., et al., "Interactive Pen-and-Ink Illustration", *Proceedings of SIGGRAPH 1994*, 8 pages.
Shapira, et al., "Image Appearance Exploration by Model-Based Navigation", *Computer Graphics Forum, Eurographics*, vol. 28 (2009), No. 2, (Mar. 30 to Apr. 3, 2009), 10 pages.
Shechtman, Eli et al., "Regenerative Morphing", *CVPR*, (2010), 8 pages.
Shechtman, et al., "U.S. Appl. No. 12/868,540, filed Aug. 25, 2010", 34 pages.
Sims, Karl "Artificial Evolution for Computer Graphics", *Computer Graphics* 25,4, (Aug. 1991), 9 pages.
Sunkavalli, Kalyan et al., "Multi-Scale Image Harmonization", *ACM SIGGRAPH*, vol. 29 (2010), 10 pages.
Turk, Greg "Texture Synthesis on Surfaces", *Proceedings of SIGGRAPH 2001*, 8 pages.

(56) References Cited

OTHER PUBLICATIONS

Van Laerhoven, Tom "An Extensible Simulation Framework Supporting Physically-based Interactive Painting", *PhD thesis, University of Limburg*, (Jun. 21, 2006), 171 pages.

Wang, et al., "MobiPicture—Browsing Pictures on Mobile Devices", *Proceedings of the eleventh ACM international conference on Multimedia*, (Nov. 2, 2003), pp. 106-107.

Winkenbach, Georges et al., "Computer-Generated Pen-and-Ink Illustration", *Proceedings of SIGGRAPH 1994*, 11 pages.

Winnemoeller, et al., "U.S. Appl. No. 12/858,552, filed Aug. 18, 2010", 70 pages.

Wong, Michael T., et al., "Computer-Generated Floral Ornament", *Proceedings of SIGGRAPH 1998*, (1998),12 pages.

Wonka, Peter et al., "Instant Architecture", *ACM Trans. Graph.*, 22 (2003), 3, 9 pages.

"Corrected Notice of Allowance", U.S. Appl. No. 12/858,546, (Jun. 6, 2013), 8 pages.

"Notice of Allowance", U.S. Appl. No. 12/868 519 (Jun. 17, 2013), 10 pages.

\* cited by examiner

METHODS AND APPARATUSES FOR GENERATING THUMBNAIL SUMMARIES FOR IMAGE COLLECTIONS

PRIORITY CLAIM

This application claims benefit of priority of U.S. Provisional Appl. No. 61/243,931, filed Sep. 18, 2009, which is hereby incorporated by reference in its entirety.

BACKGROUND

Description of the Related Art

Digital photography first began to appear in the United States in the 1990s. Nowadays digital cameras are commonplace, ranging from higher-end professional devices to lower-end mobile phones. With few exceptions, digital cameras have essentially replaced their film counterparts.

An advantage of digital photography over film is its freedom to capture a multitude of images without virtually no added expense. In fact, there are situations where a user may take hundreds or even thousands of pictures at a time. Most modern digital cameras have a small display that allows the photographer to view the images stored in the camera's memory. When a camera is set to "view" or "play" mode, a user may be able to manipulate the stored images to some extent; e.g., delete a poor quality picture, etc. To help the user navigate the images stored in the camera, the camera may display "thumbnails" of the images.

At some point the user typically transfers the pictures from the camera's memory to a computer for cataloguing and further processing. For example, the newly taken pictures may be added to an image collection. An image collection software application may create thumbnails for the transferred images, and several thumbnails may be viewed simultaneously on a larger computer screen at a later time. However, as the number of thumbnails in a collection increases, it may become more difficult to manage and browse through them.

SUMMARY

Various embodiments of methods and apparatuses for generating or selecting thumbnails for image collections are described. Embodiments of a method for generating thumbnails for image collections may generate a set of summarizing thumbnails for an input collection of images; the summarizing thumbnails may be representative of the image collection while being disjoint from each other. Furthermore, in contrast to standard, uniformly scaled thumbnails that are scaled-down versions of entire images, the set of summarizing thumbnails may represent local regions of images in a subset of images that are representative of the image collection as a whole.

Embodiments of a method for generating or selecting summarizing thumbnails for image collections may be implemented, for example, in a thumbnail selection module. Embodiments of the thumbnail selection module may be implemented in a variety of devices and systems, including, but not limited to, desktop and notebook computer systems, handheld computers, digital cameras, digital video recorders, cell phones, PDAs, or in general any type of computing or electronic device.

Embodiments of a method for generating summarizing thumbnails may obtain as input a collection of images for which thumbnails are to be generated. Some embodiments may also receive input specifying one or more thumbnail selection parameters, for example the number and size of the thumbnails to be generated. The method may sample crops from some or all images in the image collection. From these candidate crops, the method may iteratively select representative but disjoint crops. Additionally or alternatively, crops may be selected using a gradient descent, alternating optimization, belief propagation, or any other suitable method.

A method may select crops that generally represent the input image set while remaining as disjoint from each other as possible. In some embodiments, to select crops, a method iteratively evaluates each crop's fitness to represent the image collection (referred to as a crop's completeness), evaluates all crops' disjointedness with respect to the currently selected set of crops, and then selects a crop that maximizes the completeness and disjointedness metrics. A method may generate as output a set of summarizing thumbnails for the image collection based, at least in part, upon the selected crops. Each summarizing thumbnail may be viewed as a representative for a corresponding cluster of images in the image collection.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatuses for generating thumbnail images ("thumbnails") are described. In some embodiments, each thumbnail represents at least one corresponding image within an image collection. In other embodiments, a fewer number of thumbnails than the total number of images within the image collection may summarize the image collection. For example, embodiments of a method for generating or selecting summarizing thumbnails for an image collection may provide as output a small set of summarizing thumbnails for a large set of images. Each summarizing thumbnail may be representative of several images within the image collection, and these summarizing thumbnails may be disjoint from each other.

The summarizing thumbnails may be relatively small subimages (each a region or selected subarea from one of the images in the collection) that are representative of the image collection. The images in the image collection may typically, but do not necessarily, have some redundancy, common object, and/or common or similar background. The summarizing thumbnails may be viewed as the centers for clusters of images in the image collection. In contrast to standard, uniformly scaled thumbnails that are scaled-down versions of entire images, the set of summarizing thumbnails may represent local regions of images in a subset of images that are representative of the image collection as a whole.

Figure 5:
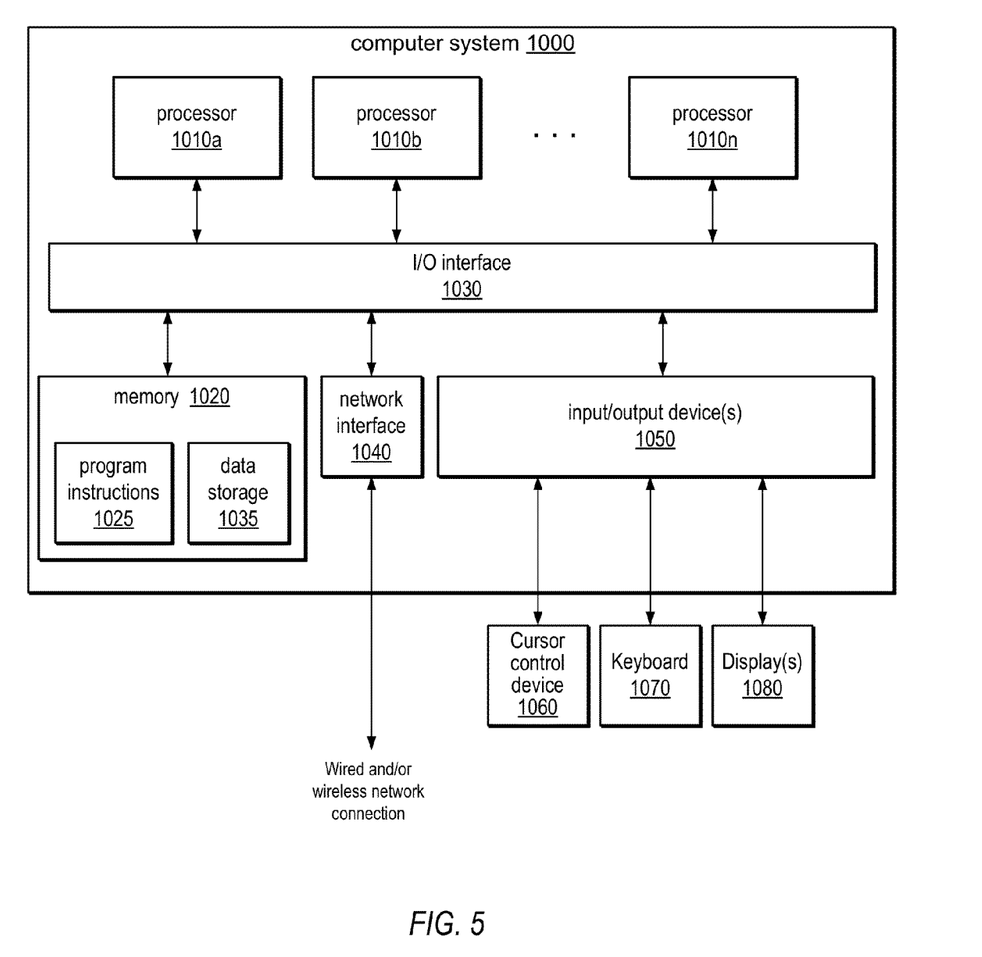
FIG. 5 is a block diagram of a computer system capable of implementing some of the embodiments.

Embodiments of a method for generating summarizing thumbnails for image collections may be implemented, for example, in a thumbnail selection module. An example thumbnail selection module is illustrated in FIG. 5. An example system on which embodiments of a thumbnail selection module may be implemented and executed is illustrated in FIG. 6.

Figure 1:
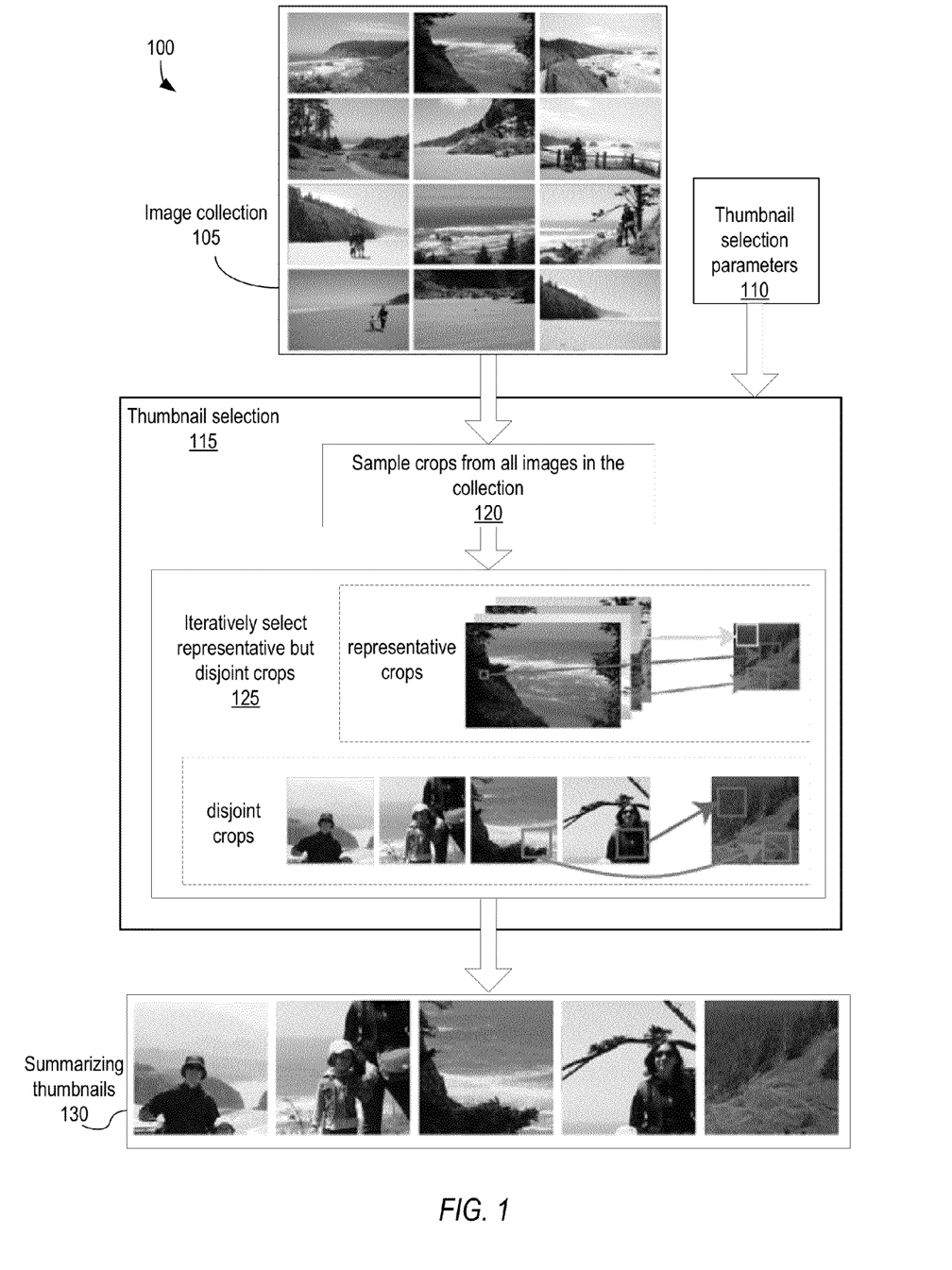
FIG. 1 graphically illustrates a method for generating or selecting summarizing thumbnails according to some embodiments.

FIG. 1 graphically illustrates an overview of a method 100 for generating or selecting summarizing thumbnails according to some embodiments. Method 100 may obtain as input a collection of images 105 for which thumbnails are to be generated. Collection of images 105 may be a new collection or an existing collection, and individual ones of images 105 may be stored in any suitable digital image format, whether compressed or uncompressed. When collection of images 105 is an existing collection, some or all of the images that it contains may already have thumbnails. For example, each image within an existing collection may already have an individual thumbnail associated with it. In those cases, method 100 may, for example, generate another set of summarizing thumbnails that may provide an alternative or summary view of the entire collection with fewer and/or different thumbnails than the original thumbnails.

In some embodiments, method 100 may receive an input specifying one or more thumbnail selection parameters 110. For example, selection parameters 110 may include the number and/or size of the thumbnails to be generated. The input may be provided by a user or may be derived from a user's preferences setting. Additionally or alternatively, the input may be automatically computed based on the size, type, and/or number of pictures in the collection, etc.

Method 100 may create candidate crops by sampling subsets of pixels (which may also be referred to as "crops") from some or all images in the image collection 105, as indicated at 120. From these candidate crops, method 100 may iteratively select representative but disjoint crops, as indicated at 125. Method 100 may select crops that are generally representative of the input image set (representative crops) while remaining disjoint or different from each other (disjoint crops). In some embodiments, to select crops, method 100 iteratively evaluate all crops' fitness to represent the image collection (referred to as a crop's completeness, or $\Delta C$), evaluate all crops' disjointedness or unlikeness D with respect to the currently selected set of crops, and then select a new crop dependent upon the completeness and disjointedness metrics.

In certain embodiments, the selected crop may be the crop that jointly maximizes the completeness and disjointedness metrics. However, any suitable goal-seeking selection function based on the completeness and/or disjointedness metrics may be employed, and the selection function need not guarantee that an absolute maximization of the individual or joint metrics will be achieved by the selected thumbnail. It is noted that in some embodiments, the completeness and/or disjointedness metrics may be implemented in an inverse format, such that the selection function may seek to identify thumbnails that have smaller rather than larger values of one or more of these metrics. Method 100 may generate as output a set of summarizing thumbnails 130. As such, summarizing thumbnails 130 may be viewed as the centers for clusters of images in the image collection 105.

Furthermore, although method 100 is described as being configured to iteratively select crops, a person of ordinary skill in the art will recognize in light of this specification that other implementations need not be iterative in nature. For example, in alternative embodiments, crops may be selected using a gradient descent, alternating optimization, belief propagation, or any other suitable goal-seeking selection function, whether iterative or non-iterative. Generally speaking, those crops selected according to the selection function may be referred to as an "optimal set" of crops, in that such crops have been determined according to the degree to which they satisfy the goals expressed by the selection function. As noted above, the selection function may but need not guarantee that the selected crops represent the best possible set of crops that satisfy the selection function. For example, the selection function might be configured to determine the selected crops subject to a certain probability that the selected crops represent a best objective solution, or subject to a confidence interval that bounds the error between the selected crops and a best objective solution.

In some embodiments, method 100 may assign weights to the completeness and/or disjointedness metrics. These weights may be, for example, received as or with thumbnail selection parameters 110. In these instances, a user may select the level of completeness and/or disjointedness desired, for example, if a first execution of the method provides unsatisfactory thumbnails, etc.

Figure 2:
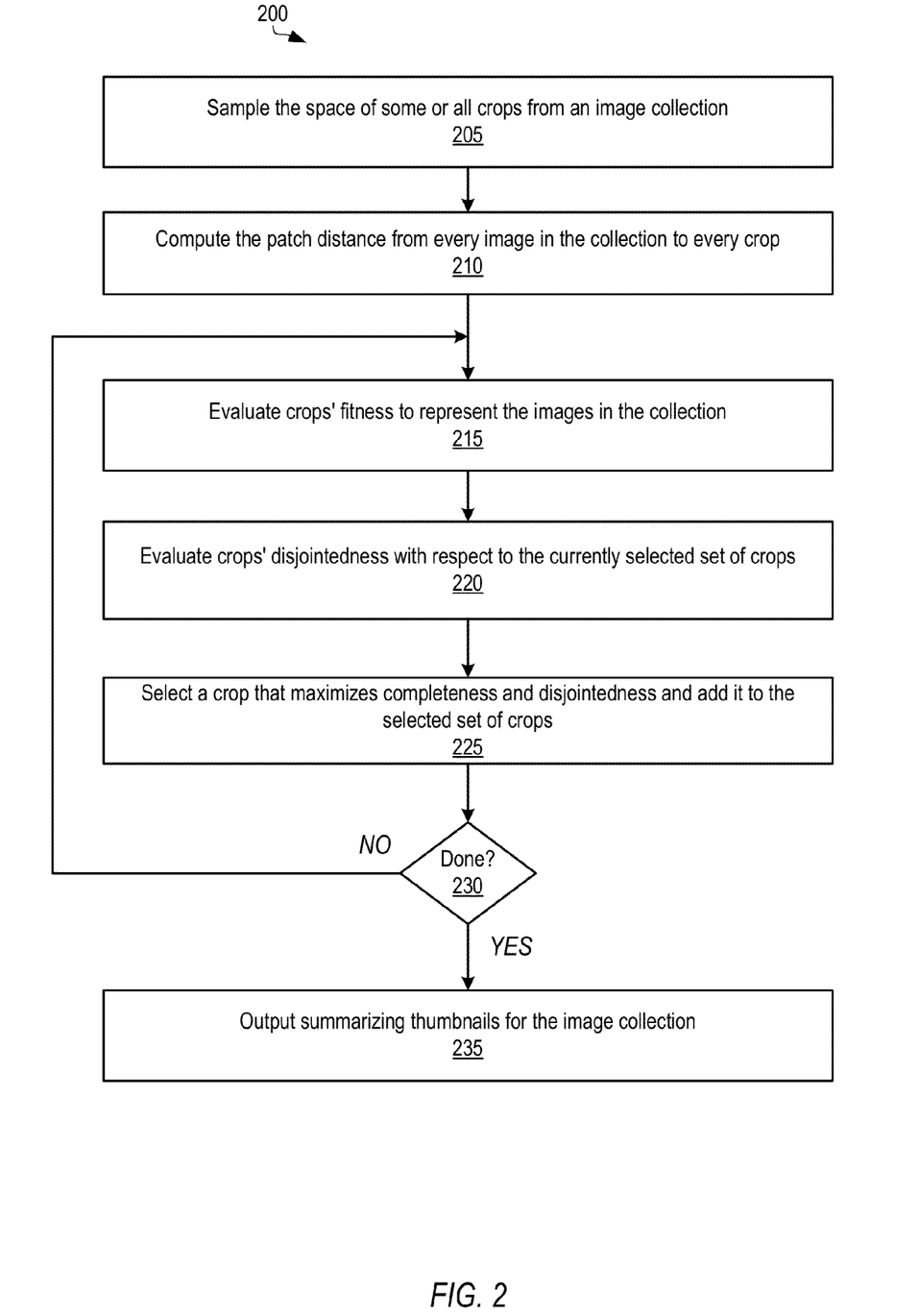
FIG. 2 is a flowchart of another method for generating or selecting summarizing thumbnails according to some embodiments.

FIG. 2 is a flowchart of another method for generating or selecting summarizing thumbnails according to some embodiments. A collection of images may be obtained. For example, the image collection may include digital photographs captured via a digital camera, or digital images that were digitized from conventional photographs or film negatives. The collection of images may reside in a digital camera, computer, mobile phone or any other electronic device capable of performing this particular method. As an example, the image collection may include digital or digitized frames or clips from captured video. As another example, the image collection may include synthesized images, such as, for example, drawings, renderings, 3-D pictures, or the like. In general, the image collection may include any type of digital image, or combinations thereof. Each image or thumbnail may be in or more formats such as, for example, JPEG, JFIF, Exif, TIFF, RAW, PNG, GIF, BMP, CGM, SVG, PNS, JPS, etc. A person of ordinary skill in the art will recognize in light of this specification that any suitable format may be used. In some embodiments, in addition to the collection of images, one or more thumbnail selection parameters may be obtained and/or generated. Thumbnail selection parameters may include, but are not limited to, thumbnail size (e.g., by number of pixels), maximum number of thumbnails to be generated, representativeness or completeness of resulting thumbnails, and/or distinctiveness of resulting thumbnails.

In some embodiments, thumbnail selection parameters may be provided based in part on the size of the collection of images. For example, a user may set a ratio of thumbnails such that n thumbnails are generated for every m images in the collection, or may provide an absolute number of thumbnails for the entire collection. The number of thumbnails may be provided, for example, as a maximum or minimum value.

Additionally or alternatively, a software program within the digital camera, computer, or other device where the image collection resides may automatically determine at least some of the thumbnail selection parameters. For example, if the software program determines that, within the same collection there are pictures of subject A and pictures of subject B, then the software program may select thumbnails that are proportionally distributed between A's images and B's images. Similarly, if the software program determines that some images within the collection seem to be portraits, and that other images seem to be landscapes, then the method of FIG. 2 may select thumbnails that are proportionally distributed according to the type of pictures in the collection. The type of picture may be inferred, for example, using object detection technology, camera settings associated with a particular picture (e.g., Exif data), or the like.

Figure 3:
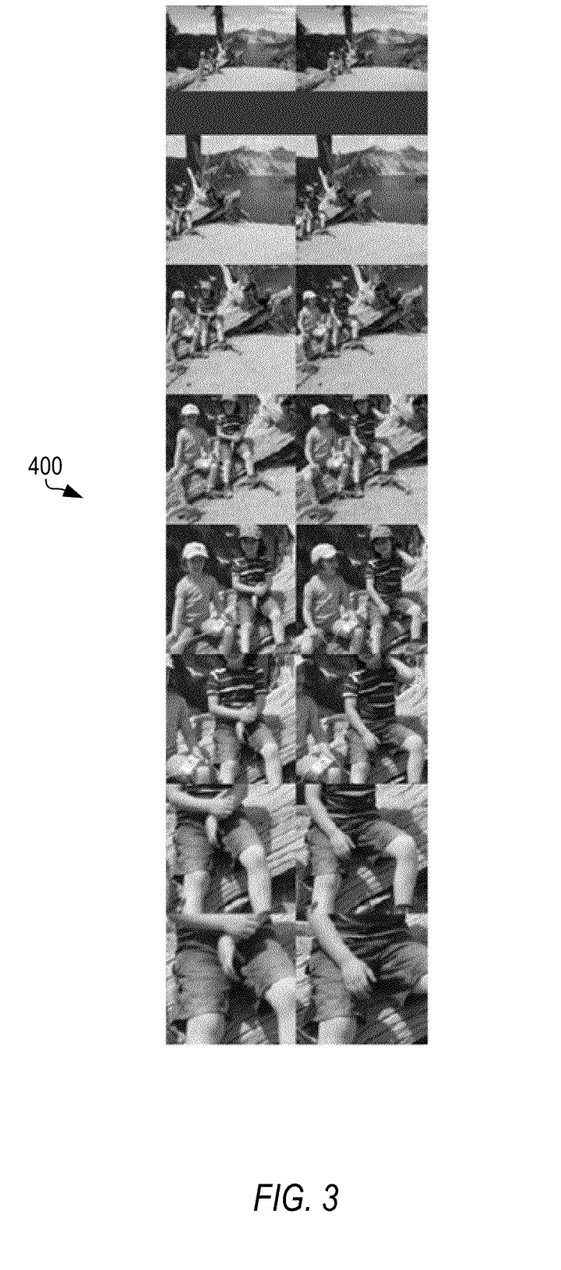
FIG. 3 shows an example of crops sampled from two images at varying scales.

As indicated at 205, a space of some or all crops from some or all of the images in the image collection may be sampled. In some embodiments, the space that the summarizing thumbnails are selected from may be a set of all possible crops of a given size from the image collection, for example, at varying scales. The full space of crops may be too large to examine fully; therefore, some embodiments may subsample the space, for example by examining crops arranged in a grid on each image, by randomly selecting crops from the space, by applying a filter to select crops according to some measurable characteristic (e.g., size, appearance, etc.), or according to any other suitable subsampling technique. FIG. 3 shows an example of crops 400 sampled from two images at varying scales. Each row represents a different level of scale.

Referring back to FIG. 2, a patch distance from every input image to every crop may be computed at 210. For instance, for each input image i and crop j, let $d_{i\{j\}}(x,y)$ be the patch distance map from i→j at the patch centered at location (x,y). Some embodiments may compute $d_{i\{j\}}$ for all i and j.

Generally speaking, a "patch" may refer to a region of an image, which may be identified in terms of a number of vertices of a polygon, in terms of one or more functions that identify the boundaries of the patch, in terms of surfaces in a multidimensional space, or in any other suitable type of representation. "Patch distance" may refer to a metric, such as a scalar or vector that expresses the distance between patches within some representational space. For example, one measure of patch distance might reflect the geometric distance between patches in a two- or three-dimensional visual space. However, patch distance may also be determined within spaces having any suitable number of dimensions.

It is noted that the distance between patches need not be determined in the same space in which the patches are defined with respect to an image. For example, a patch may be defined as a region of an image having specific dimensions or extents within the image, such as a surface. This space in which a patch is defined may be referred to as "image space." However, patches may be compared with a "patch space" that differs from the image space. For example, whereas a given patch may correspond to a surface within an image space, the given patch may correspond to a point within a multidimensional patch space, where the point represents some transformation of the patch information in the image space (such as a concatenation or other transformation of the pixel values that lie within the boundaries of the patch in the image space). Thus, one measure of patch distance between two patches is the distance between the points representing those patches in the patch space. A scalar distance between patches may be determined within the patch space using any of a variety of suitable norms, such as the L2 norm, the L1 norm, the truncated L2 norm, the L-infinity norm, etc. As an example implementation, an embodiment may employ square patches having pixel extents of 7×7 in the image space. To determine patch distances, this embodiment may map these patches onto points in a 7×7×3 multidimensional color space that corresponds to the patch space and may determine patch distances within this space according to, e.g., the L2 norm.

In some embodiments, a patch distance map may be generated according to a nearest neighbor search algorithm or technique. In some embodiments, the patch distance map may be generated according to a randomized correspondence algorithm for structural image editing, for example the Patch-Match algorithm as described in *Patch-Match: A Randomized Correspondence Algorithm for Structural Image Editing. ACM Transactions on Graphics*, Barnes, C., Shechtman, E., Finkelstein, A. and Goldman, Dan B., *Proc. SIGGRAPH* 28(3), August 2009.] However, other nearest neighbor search algorithms or techniques may be used in other embodiments. For example, an algorithm based on kd-trees (k-distance trees), a brute force search technique, or other suitable technique may be used.

As indicated at 215, each crop's fitness to represent the input images may be evaluated. An example metric for this fitness may be referred to as "completeness" or as "representativeness." Qualitatively speaking, completeness of an output image (e.g., a crop) may refer to the degree to which the output image contains or represents the visual information of the input image (e.g., the image or set of images from which the crop was obtained). That is, a crop that matches more regions of an input image or set of images (e.g., thumbnails) than a different crop may be said to have a higher completeness than the latter crop. Completeness may also be assessed with respect to a set of output images. For example, the completeness of a set of output images may indicate the degree to which the set collectively represents the visual information present in an input image or set of input images.

When considering the completeness of a set of crops with respect to an input image collection, it may be useful to determine the extent to which a particular one of the crops contributes to the completeness of the set. (For example, some crops may contribute more unique information about the input collection than others do.) In some embodiments, for each crop j, the additional completeness, $\Delta C_j$, that the respective crop would provide with respect to the input image collection, may be calculated as follows. For each input image i, a patch distance map $d_{i,S}(x,y)$ may be maintained that records the distance for each patch of the input map to the nearest neighbor or corresponding patch in the current set of summarizing thumbnails, S. Therefore, the additional completeness $\Delta C_j$ may be represented as:

$$\Delta C_j = \sum_{x,y} d_{i,S \cup \{j\}}(x, y) - d_{i,S}(x, y) \quad \text{Equation (1)}$$

where:

$$d_{i,S}(x, y) = \min_{k \in S} d_{i,\{k\}}(x, y)$$

and:

$$d_{i,0}(x, y) = \infty$$

Qualitatively speaking, equation (1) may be understood to evaluate the difference in the patch distance map $d_{i,S}(x,y)$ when a crop j is considered alongside the other members of the current set of summarizing thumbnails S, versus the case where set S is evaluated without including crop j. In this example formulation, distance map $d_{i,S}(x,y)$ for a particular input image i may be defined as the minimum of the distances between image i and the various members of set S, where the distance between an image i and a null set of summarizing thumbnails is defined to be infinity.

However, it is noted that other formulations for determining additional completeness and the patch distance map are possible and contemplated in various embodiments. For example, additional completeness may be implemented as a weighted function of the distance maps. In some embodiments, one or more patch distances may be weighted by a saliency measure based on face detection such that patches that are located in relative proximity to a face may receive a larger weight than others. These embodiments may encourage crops to include people's faces, which may be desired in certain applications. Moreover, the distance map for a particular input image i need not be implemented as an absolute minimum, but instead may be implemented as an average, weighted average, approximate minimum, or some other suitable function of image i and the current set of summarizing thumbnails S.

As indicated at 220, the crops' disjointedness with respect to the currently selected set of crops may be evaluated. In some embodiments, the change in total disjointedness after adding a crop or thumbnail, $\Delta D$, may be defined as the negative of a crop or thumbnail's completeness with respect to the selected set of crops or thumbnails (though other definitions of disjointedness are possible and contemplated). Therefore, $\Delta D$ may be evaluated with respect to the currently selected set S as follows. Let $d_{j,k}$ be the nearest neighbor patch distance from crop j to crop k. Then:

$$\Delta D_j = -\sum_{x,y} \sum_{k \in S} d_{j,k}(x, y) \quad \text{Equation (2)}$$

In some embodiments, if the selected set is currently empty, then at the operation at 220 may not be performed and the disjointedness metric $\Delta D$ may be set to a value (e.g., 0) so that only completeness $\Delta C_j$ is considered (in equation (3) below) at 208. Other embodiments may use other methods for the case of an empty selected set. For example, a first thumbnail of the set may be created based on an arbitrary image within the collection. Additionally or alternatively, method 200 may allow a user to select an initial image or a portion of the initial image to serve as a first thumbnail for the collection.

As indicated at 225, a crop that maximizes completeness and disjointedness may be selected and added to the selected set of crops. In some embodiments, the currently selected set S may be augmented with the crop that has the highest score according to a weighting factor α in the following function:

$$S' = S \cup \{\arg\max_j(\Delta C_j + \alpha D_j)\} \quad \text{Equation (3)}$$

In some embodiments, weighting factor α may be user selectable or defined by a software program executing method 200. For example, the user may select an adjustment factor ranging from a combination of large representativeness with small distinctiveness (thus increasing the number of thumbnails) to a combination of small representativeness with large distinctiveness (thus decreasing the number of thumbnails). This adjustment factor may be provided, for example, in a sliding scale control of a user interface. The adjustment factor may be used directly as weighting factor α or may be transformed prior to its application.

In some embodiments, an optimization of a crop selection process may be performed by minimizing an energy function such as, for example:

$$E(S) = C(S) + \alpha D(S) \quad \text{Equation (4)}$$

where C(S) is the sum of patch-based distances of all images i in the image set I, to crops j in the set S, given by:

$$C(S) = \sum_{i \in I} \sum_{j \in S} \sum_{x,y} d_{i,j}(x, y) \quad \text{Equation (5)}$$

and where D(S) is a negative function of the sum of pair-wise distances of crops j and k in the set S, given by:

$$D(S) = -\sum_{j \in S} \sum_{k \in S, k \neq j} \sum_{x,y} d_{j,k}(x, y) \quad \text{Equation (6)}$$

As noted previously, although the various implementations involve the maximization and/or minimization of completeness and/or disjointedness (functions), it is contemplated that a crop may be selected for addition to set S dependent upon any suitable function of completeness and disjointedness. For example, an energy function may be expressed in terms of an objective function, and a goal-seeking process (e.g., an optimization routine or other suitable algorithm) may attempt to find a solution to the objective function (e.g., by identifying a particular crop) that achieves a defined goal with respect to the objective function, such as by maximizing or minimizing the objective function or attempting to drive the objective function to a particular value.

In various embodiments, the goal-seeking process may or may not guarantee convergence to an absolute solution. For example, the goal-seeking process may exhaustively evaluate a solution space to ensure that the identified solution is the best available. Alternatively, the goal-seeking process may employ heuristic or probabilistic techniques that provide a bounded confidence interval or other measure of the quality of the solution. For example, the goal-seeking process may be designed to produce a solution that is within at least some percentage of an optimal solution, to produce a solution that has some bounded probability of being the optimal solution, or any suitable combination of these or other techniques.

At 230, one or more criteria may be evaluated to determine if the method is done. If method 200 is not done, then method 200 may return to 204 and repeat elements 204 through 206. If method 200 is done, then a set of summarizing thumbnails for the image collection may be output, as indicated at 212. The criteria evaluated at 210 may include one or more of, but are not limited to, a maximum number of thumbnails to be generated for the image collection, and a maximum amount of display (e.g., number of pixels of the entire set of thumbnails), storage and/or memory space to be used, etc. In some embodiments, the criteria may include criteria that are specific to the goal-seeking process, for example by measuring or estimating an error function, confidence interval, or other indicator of solution quality or convergence.

Figure 4:
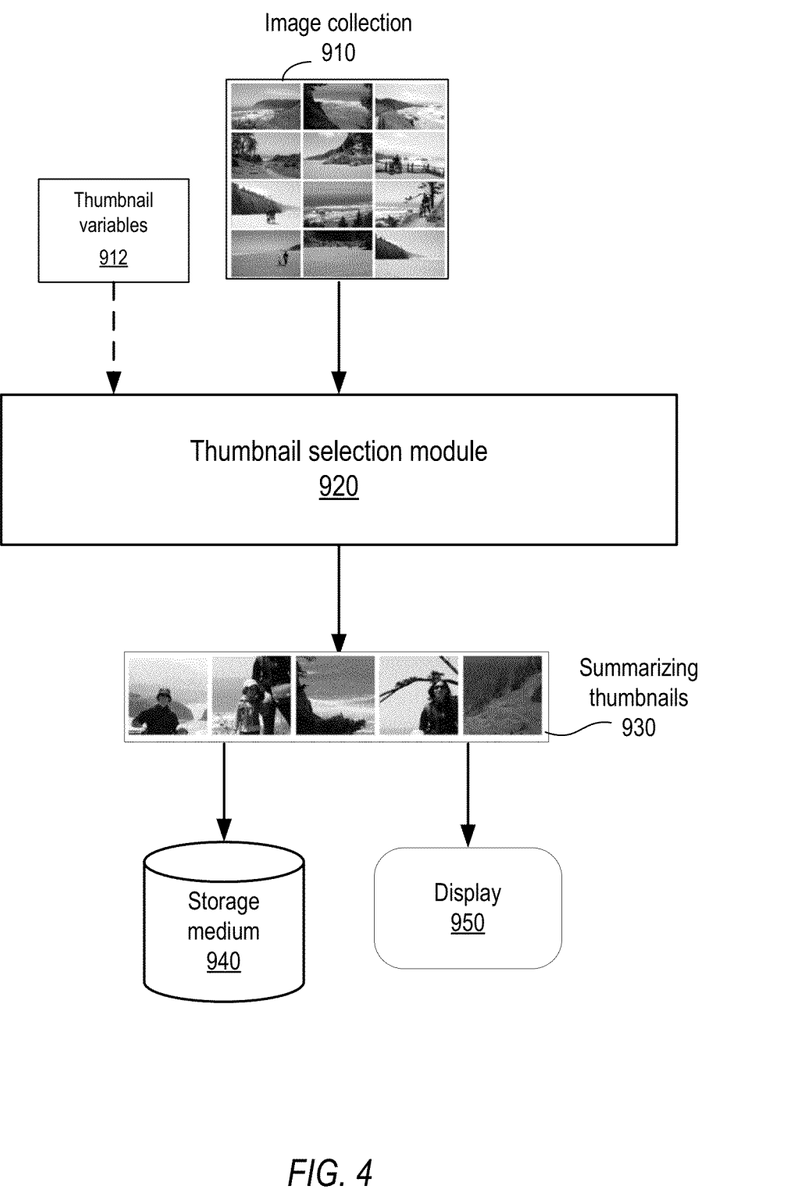
FIG. 4 is a block diagram of a thumbnail generation module capable of implementing a method for generating summarizing thumbnails according to some embodiments.

FIG. 4 illustrates a thumbnail selection module that may implement a method for generating summarizing thumbnails for image collections as illustrated in FIGS. 1 and 2. FIG. 5 illustrates an example computer system on which embodiments of module 920 may be implemented. Module 920 may, for example, be implemented as or in a stand-alone application or as a module of or plug-in for an application, or as a library function. Module 920 receives as input a collection of images 910. Module 920 may also receive input 912 specifying one or more thumbnail selection parameters. Thumbnail selection parameters may include one or more of, but are not limited to, thumbnail size, a maximum number of thumbnails to be generated, a value for weighting factor $\alpha$ used in equation (3), and/or a value for weighting factor $\mu$ used in equation (4). Module 920 may sample crops from some or all images in the collection and then may iteratively select representative but disjoint crops. Module 920 generates as output a set of summarizing thumbnails 930. Summarizing thumbnails 930 may, for example, be stored to a storage medium 940, such as system memory, a disk drive, DVD, CD, etc., and/or displayed on a display 950.

In some embodiments, thumbnail selection module 920 may provide a user interface including one or more user interface elements via which a user may interact with the module 920, for example to specify, select, or change the value for one or more thumbnail selection parameters 912.

Illustrative Computer System

Embodiments of a thumbnail selection module as described herein may be executed on one or more computer systems, which may interact with various other devices. One such computer system is illustrated in FIG. 5. In different embodiments, computer system 1000 may be any of various types of devices, including, but not limited to, a personal computer system, desktop computer, laptop, notebook, or netbook computer, mainframe computer system, handheld computer, workstation, network computer, a camera, a video camera, a set top box, a mobile device, a mobile phone, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the thumbnail selection methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a thumbnail selection module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 5, memory 1020 may include program instructions 1025, configured to implement embodiments of a thumbnail selection module as described herein, and data storage 1035, comprising various data accessible by program instructions 1025. In one embodiment, program instructions 1025 may include software elements of embodiments of a thumbnail selection module as illustrated in the above Figures. Data storage 1035 may include data that may be used in embodiments. In other embodiments, other or different software elements and data may be included.

A person of ordinary skill in the art will appreciate in light of this specification that computer system 1000 is merely illustrative and is not intended to limit the scope of a thumbnail selection module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

A person of ordinary skill in the art will also appreciate in light of this specification that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible or readable medium may include any tangible storage or memory media such as magnetic or optical media, e.g., disk or DVD/CD-ROM, volatile or non-volatile media such as RAM (e.g., SDRAM, DDR, RDRAM, SRAM, etc.), ROM, etc. Additionally or alternatively, instructions and/or data may also be transmitted via transmission media or signals that are distinct from storage and memory media. For example, such signals may include electrical, electromagnetic, or digital signals, conveyed via a transmission or communication medium such as a wired network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

What is claimed is:

1. A method, comprising:
   performing, by one or more computing devices:
   sampling crops from images in a collection of images;
   generating candidate crops from the sampled crops;
   for each candidate crop:
   determining a completeness metric; and
   determining a disjointedness metric;
   evaluating the completeness metric or the disjointedness metric of each candidate crop relative to the completeness metric or the disjointedness metric of another crop from among a set of candidate crops;
   responsive to the evaluating, selecting an optimal set of representative but disjoint crops from the candidate crops; and
   generating a set of summarizing thumbnails for the collection of images based on the selected optimal set of representative but disjoint crops.

2. The method of claim 1, further comprising computing a patch distance from at least one image in the collection of images to at least one candidate crop prior to the selecting operation.

3. The method of claim 1:
   wherein for a given one of the candidate crops, the completeness metric indicates a degree of the given candidate crop to represent the visual information of the images in the collection;
   wherein for the given candidate crop, the disjointedness metric indicates an unlikeness of the given candidate crop with respect to the another crop of the set of candidate crops; and further comprising until a stopping criterion is satisfied:
   adding a given candidate crop to the optimal set of representative but disjoint crops based, at least in part, on the given candidate crop's completeness and disjointedness metrics.

4. The method of claim 3, wherein the stopping criterion includes a desired number of thumbnails within the set of summarizing thumbnails.

5. The method of claim 4, wherein the desired number of thumbnails is determined based on a number of images in the collection of images.

6. The method of claim 1, wherein the selecting comprises selecting a candidate crop that optimizes an energy function that combines completeness and disjointedness metrics.

7. The method of claim 1, wherein the sampling operation comprises sampling crops from images at varying scales.

8. The method of claim 7, wherein the varying scales are determined based, at least in part, on a desired thumbnail size for a thumbnail within the set of summarizing thumbnails.

9. A non-transitory computer-readable storage medium having instructions stored thereon that, upon execution by a computer system, cause the computer system to perform operations comprising:
   identifying a set of summarizing thumbnails associated with a collection of images;
   sampling subsets of pixels from a plurality of images within the collection of images;
   generating a plurality of candidate crops based, at least in part, on the sampled subsets of pixels;
   calculating, for each of the plurality of candidate crops, a value based on a representativeness metric and a distinctiveness metric of each of the plurality of candidate crops;
   selecting a candidate crop among the plurality of candidate crops, based, at least in part, on the value based on the representativeness metric and the distinctiveness metric of each of the plurality of candidate crops; and
   generating a new thumbnail based, at least in part, on the selected candidate crop.

10. The non-transitory computer-readable storage medium of claim 9, the operations further comprising:
    determining a number of thumbnails to be added to the set of summarizing thumbnails; and
    repeating at least the generating operation until the number of thumbnails to be added is reached.

11. The non-transitory computer-readable storage medium of claim 9, the operations further comprising calculating the representativeness metric for a candidate crop based, at least in part, on an additional completeness that the candidate crop provides with respect to the collection of images.

12. The non-transitory computer-readable storage medium of claim 11, the operations further comprising calculating the representativeness metric based, at least in part, on patch distance measurements, wherein at least one patch distance measurement receives a weight based, at least in part, on a face detection.

13. The non-transitory computer-readable storage medium of claim 9, the operations further comprising calculating the distinctiveness metric for a candidate crop based, at least in part, on an unlikeness that the candidate crop provides with respect to the set of summarizing thumbnails.

14. The non-transitory computer-readable storage medium of claim 13, the operations further comprising calculating the distinctiveness metric based, at least in part, on a patch distance measurement.

15. The non-transitory computer-readable storage medium of claim 9, wherein the calculating operation comprises combining the representativeness metric and distinctiveness metric of each of the plurality of candidate crops for each of the plurality of candidate crops.

16. The non-transitory computer-readable storage medium of claim 15, wherein the combining further comprises assigning a weight to the representativeness metric.

17. The non-transitory computer-readable storage medium of claim 16, the operations further comprising:
    receiving a user-selected representativeness weight; and
    applying the user-selected representativeness weight to the representativeness metric in connection with the combining operation.

18. The non-transitory computer-readable storage medium of claim 9, wherein the sampling operation comprises sampling each of the subsets of pixels with a size selected by a user.

19. The non-transitory computer-readable storage medium of claim 18, wherein the sampling operation comprises sampling more than one subset of pixels for each of the plurality of images within the collection of images.

20. A system comprising:
    one or more processors; and
    memory storing instructions that, responsive to execution by the one or more processors, cause the one or more processors to perform operations comprising:
    sampling a first subset of pixels from a collection of images;
    calculating, for the first subset of pixels, a first value representing a combination of a first completeness metric with a first disjointedness metric, the first completeness metric indicating the first subset of pixels representativeness relative to the collection of images and the first disjointedness metric indicating the first subset of pixels unlikeness relative to the collection of images;

sampling a second subset of pixels from the collection of images;

calculating, for the second subset of pixels, a second value representing a combination of a second completeness metric with a second disjointedness metric; and responsive to the second value being greater than the first value, creating a thumbnail based, at least in part, on the second subset of pixels.

21. The system of claim 20, wherein the first subset of pixels comprises a first image within the collection of images and the second subset of pixels comprises a second image within the collection of images.

22. The system of claim 21, wherein the first subset of pixels comprises a cropped portion of a first image within the collection of images and the second subset of pixels comprises a cropped portion of a second image within the collection of images.

23. The system of claim 22, wherein the first subset of pixels comprises a cropped portion of a first image within the collection of images and the second subset of pixels comprises another cropped portion of the first image within the collection of images.

24. The system of claim 23, the operations further comprising:

sampling a third subset of pixels from the collection of images;

calculating, for the third subset of pixels, a third value representing a combination of a third completeness metric with third disjointedness metric; and in response to the third value being greater than the first value, creating a third thumbnail based, at least in part, on the third subset of pixels.

* * * * *